(12) United States Patent
Agarwal

(10) Patent No.: US 9,020,138 B1
(45) Date of Patent: *Apr. 28, 2015

(54) TARGETED ISSUE ROUTING

(71) Applicant: Amazon Technologies, Inc., Reno, NV (US)

(72) Inventor: Saket Agarwal, Hyderabad (IN)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,286

(22) Filed: Sep. 4, 2014

Related U.S. Application Data

(63) Continuation of application No. 14/225,915, filed on Mar. 26, 2014, now Pat. No. 8,831,207.

(51) Int. Cl.
- *H04M 3/00* (2006.01)
- *H04M 5/00* (2006.01)
- *H04M 3/51* (2006.01)
- *H04M 3/523* (2006.01)

(52) U.S. Cl.
CPC .......... *H04M 3/5191* (2013.01); *H04M 3/5233* (2013.01)

(58) Field of Classification Search
CPC .................................................... H04M 3/5233
USPC ............. 379/265.12, 265.01, 265.05, 265.11, 379/265.13, 265.09
See application file for complete search history.

(56) References Cited

U.S. PATENT DOCUMENTS

| | | | |
|---|---|---|---|
| 7,936,867 B1 * | 5/2011 | Hill et al. ................. | 379/265.12 |
| 8,116,446 B1 * | 2/2012 | Kalavar .................... | 379/265.13 |
| 8,234,141 B1 * | 7/2012 | Flockhart et al. ............ | 705/7.13 |

* cited by examiner

*Primary Examiner* — Thjuan K Addy
(74) *Attorney, Agent, or Firm* — Athorus, PLLC

(57) ABSTRACT

A contact received by a service center from a customer may be assigned to one of a plurality of agents or representatives based on any prior experience with the customer or with the contact, any preferences of the customer or any skills required in order to address the contact. Preferably, an agent who previously handled an issue on behalf of the customer may be identified, and the contact may be assigned to that agent. Alternatively, the contact may be assigned to an agent preferred by the customer, or to a particularly skilled agent. If no preferred agents or particularly skilled agents are available to respond to the contact, the contact may be assigned at random to one or more particular agents. The contact may be initiated by way of a reply to a message containing a response to a previous contact, and the message may include metadata that associates the reply with the previous contact.

20 Claims, 8 Drawing Sheets

TARGETED ISSUE ROUTING

CROSS-REFERENCE TO RELATED APPLICATIONS

This application is a continuation application of U.S. patent application Ser. No. 14/225,915, filed Mar. 26, 2014, the contents of which are hereby incorporated by reference in their entirety.

BACKGROUND

Currently, many businesses or other agencies maintain service centers or other operations that are dedicated to receiving input from customers or other people. Such centers may receive feedback, opinions or other information or data from customers in one or more formats. For example, a customer may call a service center on the telephone and speak to an agent or representative in order to express his or her concerns. Alternatively, a customer may provide information or data regarding his or her concerns by electronic mail, e.g., through an E-mail client operating on his or her computer device or one or more text boxes or other input interfaces provided in an online format, or through any other form of electronic messaging. When a customer communicates with a service center regarding one or more issues, the customer's communication may be commonly referred to as a "contact."

From time to time, and for various reasons, a customer who contacts a service center regarding an issue may be prompted to contact the service center again at a later time. The subsequent contact may relate to the original issue, or to another issue that subsequently arises. The portion of customers who make return contacts, or repeat contacts, to a service center following an original contact, is substantial. Frequently, depending on the size and scope of the service center, or of the business or organization with which the service center is associated, a return contact or a repeat contact is not routed or assigned to a service center agent or representative with whom the original contact was made. Instead, such return contacts or repeat contacts may be assigned at random to any of the agents or representatives who may be available at the service center at the time of the return contacts or the repeat contacts.

Where a customer's issue is assigned from a first agent or representative to a second agent or representative, however, the second agent or representative typically must elevate his or her level of knowledge in a brief period of time, in order to properly address the customer's issue. Additionally, where a customer reports one issue to a first representative, and subsequently reports another issue to a second representative, the second representative is not likely aware of the customer's background, concerns or personal experiences as the first representative. Because a new agent or representative must get himself or herself up to speed on an issue in short order, the likelihood that the customer will be required to make further contact with the service center regarding the same issue, or different issues, frequently remains unnecessarily high, and has an adverse impact on customer experiences and satisfaction.

DETAILED DESCRIPTION

As is set forth in greater detail below, the present disclosure is directed to enhancing experiences of customers who contact a customer service center. Specifically, the systems and methods are directed to receiving a contact with a service center by a customer, identifying the customer or the issue with which the customer is concerned, and providing a reply in response to the contact that identifies an appropriate agent (or representative) for addressing the issue. The agent identified in the reply may be an agent who previously handled the issue, or an agent who has worked with the customer in the past. Alternatively, the agent may be a selected or preferred agent for the customer, who may be identified according to one or more qualitative or quantitative means, or an agent having a predetermined or minimum level of skill.

If neither a selected or preferred agent, nor a particularly skilled agent, is available for the customer, then the issue may be assigned to one or more agents among a pool. Additionally, in some embodiments, the appropriate agent may be identified by way of one or more select interfaces expressed in an electronic communication, in order to facilitate a direct contact with the appropriate agent by the customer in response to the reply. Such interfaces may enable the customer to reach the appropriate agent directly, or otherwise include information for accessing the appropriate agent.

Figure 1A:
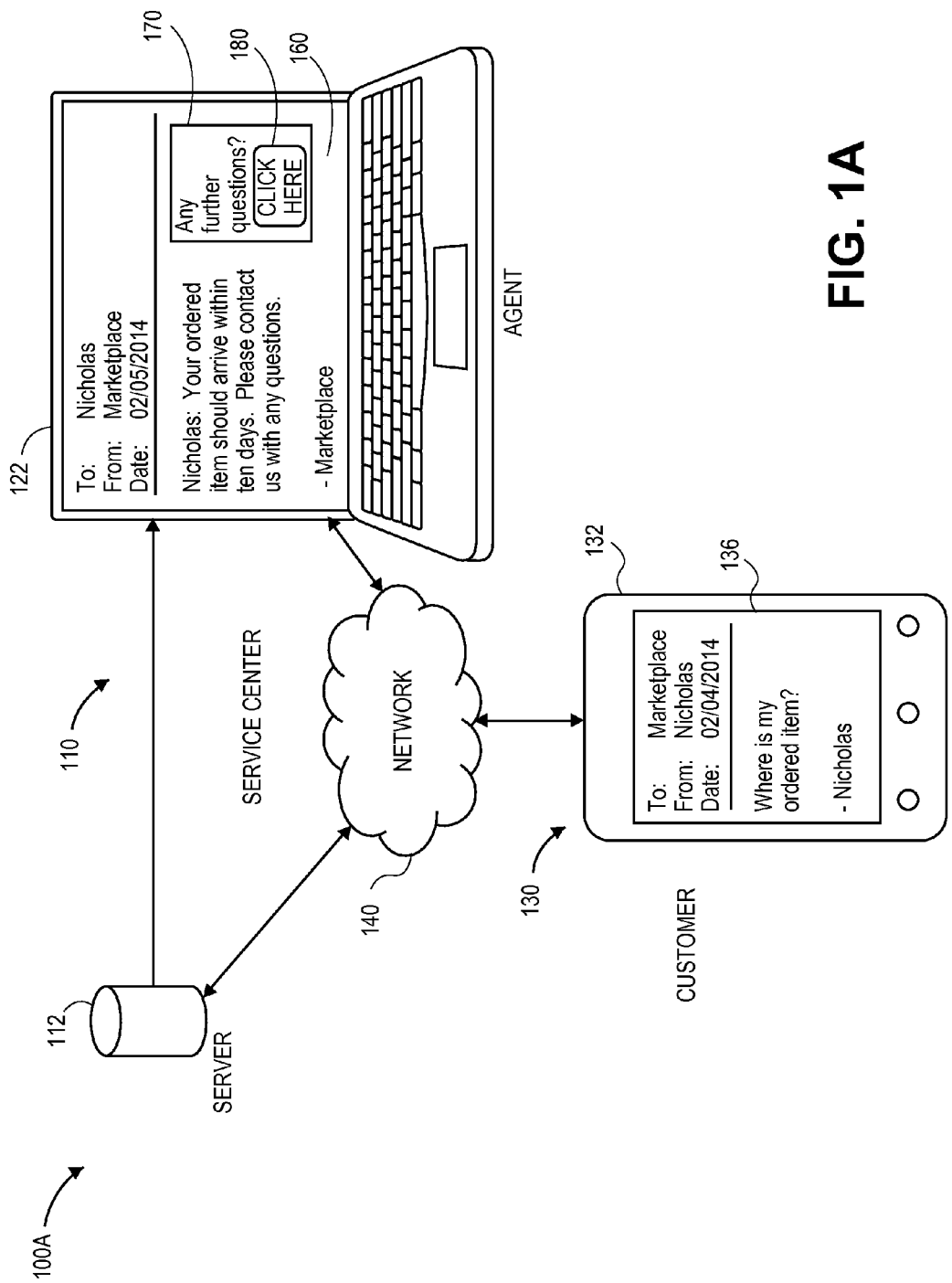
FIGS. 1A and 1B are views of components of one system for targeted issue routing, in accordance with embodiments of the present disclosure.
Figure 1B:
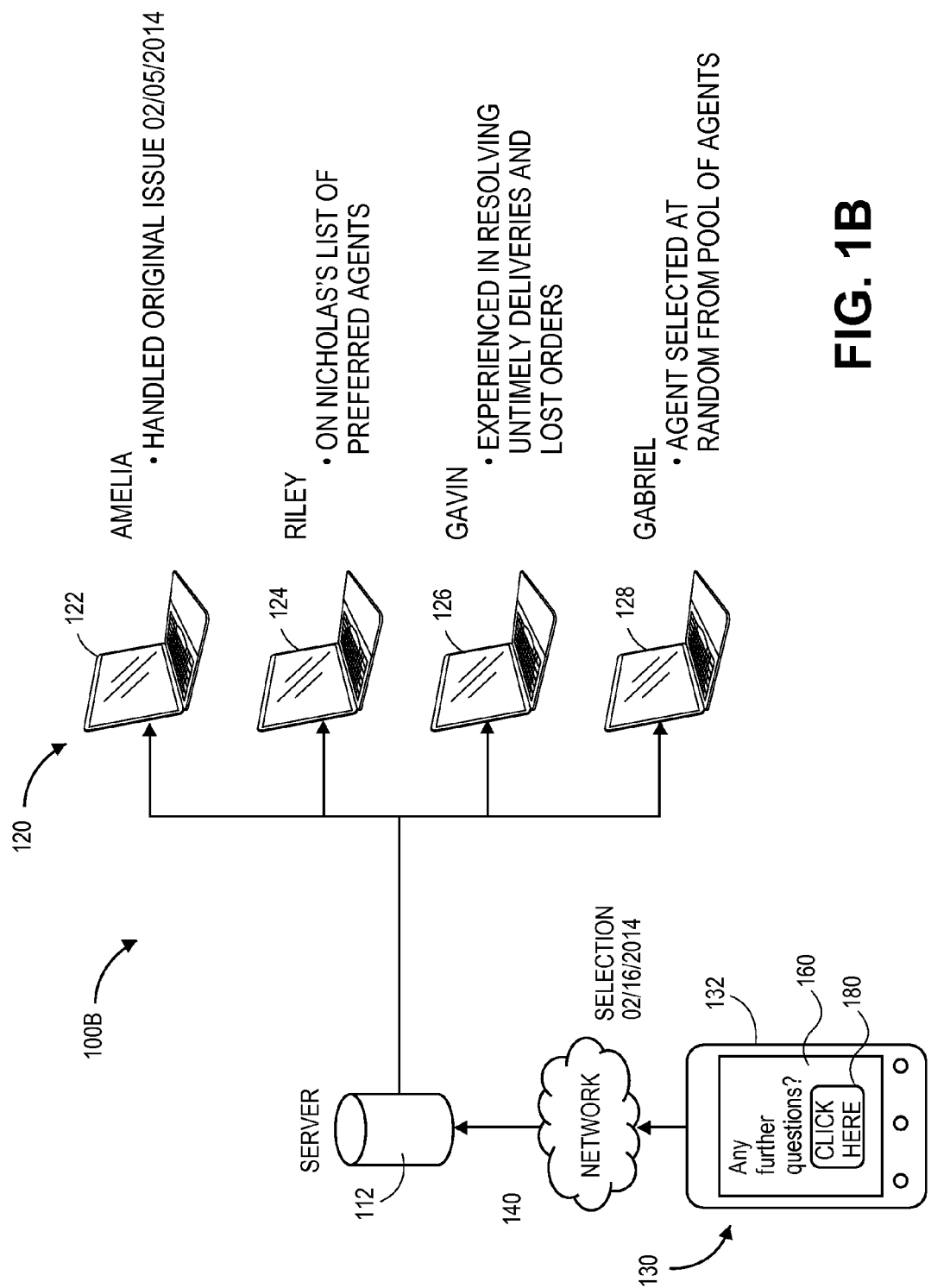

Referring to FIGS. 1A and 1B, components of one system 100A for targeted issue routing in accordance with the present disclosure are shown. As is shown in FIG. 1A, the system 100A includes a service center 110 and a customer 130. The service center 110 includes a computer server 112 and at least one agent 122, and the customer 130 operates a smartphone 132. The computer server 112 and the smartphone 132 are connected to one another across a network 140.

When the customer 130 identifies an original, relevant issue that may be handled by the service center 110, the customer 130 may reach out to the service center 110 using the smartphone 132 by way of a user interface, such as by generating an E-mail message 136A using an electronic mail (or "E-mail") client or web browser. The smartphone 132 may transmit the message 136 over the network 140 to the service center 110, which may assign the message to the agent 122 for resolution. The agent 122 may prepare a response message 160 for the customer 130, and transmit the response message 160 to the customer 130 over the network 140. The response message 160 may describe a resolution for the issue, and include an interface window 170 for enabling the customer 130 to communicate with the agent 122 directly, such as by audio (e.g., a voice over Internet Protocol, or "VoIP," telephone), video (e.g., videotelephonic) or text-based messaging, or "chat," as well as an interactive button or other feature 180 for enabling the customer 130 to reply to the response message 160. If the customer 130 wishes to reply to the response message 160, the customer 130 may click the button 180, which may return one or more bits of metadata identifying the customer 130, the history of the customer 130 in contacting the service center 110, the agent 122, and any other information or data that may be pertinent to the contact by the customer 130.

According to the systems and methods of the present disclosure, the service center 110 may identify an appropriate agent for handling the reply upon receiving the selection of the button 180 by the customer. Referring to FIG. 1B, the system 100B may determine assign the reply of the customer 130 to one of a plurality of agents 122, 124, 126, 128 according to a defined hierarchy. First, if the agent 122 who handled the original issue reported by the customer 130 is available, the reply by the customer 130 is assigned to the agent 122. Next, if a preferred agent 124 identified by the customer 130 is available, the reply by the customer 122 may be assigned to the preferred agent 124. The preferred agent 124 may be identified by any means, including an express identification by the customer 130, or an implicit identification based on ratings of one or more agents provided by the customer 130. If the reply by the customer 122 should be handled a particularly skilled representative, then the reply is assigned to an agent 126 having a relevant skill set. Finally, if neither the agent 122 who handled the original issue, the preferred agent 124 nor the agent 126 having the relevant skill set is available, then an agent 128 may be selected from a pool of agents at random, and the reply by the customer 130 will be assigned to the agent 128 for handling.

Accordingly, where a customer 130 communicates with a service center 110 by way of a subsequent contact (e.g., a return contact or a repeat contact), the targeted issue routing systems and methods of the present disclosure may enhance the experience of the customer 130 by selecting an appropriate agent 122, 124, 126, 128 for responding to the communication according to a hierarchy. In particular, the systems and methods disclosed herein may attempt to forward the communication to the agent 122 who previously worked with the customer 130 or, alternatively, to an agent 124 preferred by the customer 130, an agent 126 having a skill required in order to respond to the communication from the customer 130, or an agent 128 selected at random, thereby maximizing the likelihood that the selected agent 122, 124, 126, 128 will be competent, prepared and ready to appropriately address the concerns of the customer 130 in a timely manner.

Businesses or organizations in many industries or fields frequently provide a service center (sometimes called a "call center" or a "customer service center") to manage large numbers and types of communications received from a wide variety of people (e.g., customers), typically involving some aspect or element of customer service. Such service centers may be staffed by human operators, automated machines or a combination of operators and machines, and may be used to receive orders, to provide answers to questions, or to convey information regarding events, issues or products and services. Service centers thus permit businesses, organizations or other entities to provide a dedicated knowledge base that can respond to a variety of inquiries from a variety of people, for nearly any reason.

As with the general public at large, agents or representatives of a service center who receive communications from customers have varying degrees of qualifications or experience. For example, agents may be technically competent in certain areas, or may have particular levels of knowledge or experience regarding specific aspects of a business's or an organization's internal operations. Still other agents may be particularly well suited for handing customers who express varying degrees or ranges of emotions, such as anger, happiness or fear, when contacting the service center.

A customer may communicate with a service center by any electronic (e.g., computer-based or telephonic) means. For example, a customer may send one or more electronic messages provided by way of a client-side application (e.g., E-mail, text messages or information entered by way of one or more interfaces such as a web browser) to a server-side system maintained by the service center, or may reach the service center by any telephonic means. When a contact is received from a customer by a service center, the contact is randomly assigned to one or more agents, who may review any available information regarding the customer and/or the contact (including not only the contents of the contact but also the customer's history in communicating with the service center, the customer's purchasing history, a date or time associated with the contact, or any other relevant information), and prepare a response for routing to the customer.

Occasionally, when a customer contacts a service center regarding an issue, and receives a response from an agent at the service center, the customer may be prompted to contact the service center again at a later time. For example, the customer may be prone to complain, may have a low threshold for shortfalls or deficiencies in service, or may have repeated or persistent gripes that are legitimate and not being addressed by the service center. According to some estimates, approximately one-third of all customers who make an original contact to a service center regarding an issue ultimately contact the service center again regarding the same issue (e.g., a repeat contact), or a different issue (e.g., a return contact). A subsequent contact (e.g., either return contact or a repeat contact) by the customer is typically processed in the same manner as the original contact, viz., the subsequent contact is randomly assigned to one or more agents, who may review the information regarding not only the subsequent contact but also the customer, and prepare a response thereto.

Substantial time and resources are frequently wasted at a service center when a subsequent contact received from a customer is randomly assigned to an agent, however. In this regard, if a randomly assigned agent was not the agent who handled the original issue reported by the customer, or is otherwise unfamiliar with the customer, the agent must identify any available information regarding the customer, and become familiar with not only the issue reported in the return contact but also any specific concerns, idiosyncrasies or interests of the customer. These efforts are particularly wasteful where the subsequent contact is a repeat contact, since another agent already expended time and energy in learning more about the customer during the original contact. Moreover, the randomly assigned agent may not possess a requisite level or set of skills that may be required in order to appropriately address the subsequent contact from the customer.

The systems and methods of the present disclosure are directed to identifying a most appropriate agent or representative for handling a subsequent contact (e.g., a repeat contact or a return contact) received from a customer at a service center according to one or more general hierarchies. Upon receiving a second or further contact from a customer, the systems and methods disclosed herein may particularly target the routing of any issues expressed in the contact to a selected agent on any number of bases. For example, where an agent previously worked with the customer in handling an original or prior contact, the second or further contact may be routed directly to that agent if he or she is available to address the customer's concerns. If the agent who previously worked with the customer is not available, the contact may be routed to one or more agents who have been designated or identified as a preferred contact for the customer. If neither an agent having history in working with the customer, nor a preferred agent of the customer, is available to address the customer's concerns, the contact may be routed to one or more agents having a specific level or set of skills that are determined to be appropriate or required for handling the contact. If no agents who possess the requisite level or set of skills are available, the contact may be assigned to an agent among a pool of agents at random or on any other basis.

Accordingly, based on any available information, data or knowledge regarding a customer, or a contact reported to a service center by the customer, as well as contacts previously reported to the service center by the customer, an agent may be assigned to handle a contact by the service center with greater precision and purpose, and with less randomness, than according to the systems and methods of the prior art. As a result, the systems and methods disclosed herein improve the efficiency of a service center's operations, and increase the likelihood that a customer will have a positive experience in working with the service center.

When a subsequent contact is received from a customer, an agent who handled one or more contacts that were previously received from the customer may be identified on any basis. For example, a record or registry of information and data regarding the customer's contacts to the service center (e.g., an identification of the prior issues reported by the customer, a resolution identified for such prior issues, an agent who identified the resolution, and any steps taken to implement the resolution) may be maintained in one or more data stores. Thus, when a contact is received from a customer, and identified as a subsequent contact (e.g., a return contact or a repeat contact) from that customer, the contact may be assigned to the agent who handled one or more prior contacts received from that customer by resort to the record or registry.

Likewise, agents who are preferred by a customer may be identified on any basis. For example, a customer may expressly designate one or more such agents, e.g., in a list of such agents. Alternatively, a preferred agent for a customer may be identified through a qualitative or quantitative analysis of any customer ratings, data or feedback provided by the customer, including any such information provided in a contact. For example, where a customer is asked to rate the performance of an agent in handling his or her concerns as expressed in a contact, the agent may be expressly named in the rating, or implicitly identified through information regarding the rating, and a level of preference for the agent may be determined from a numerical (e.g., a point or "star" rating system) or a text-based evaluation of the agent provided by the customer. Agents having point-based or star-based ratings above a certain threshold may be deemed to be preferred by the customer, while agents having such ratings below the threshold may be labeled as not preferred by the customer. Furthermore, where an original agent is not available, and a set of preferred agents is identified for a customer, one of the agents in the set may be selected to handle a contact from the customer on any basis, e.g., the highest-ranking or most preferred available agent among the set. Moreover, a preferred agent may be identified for a given customer based on a global rating mechanism that considers ratings of agents provided by a plurality of customers, and compares the ratings of the agents by the given customer to the ratings of the agents provided by plurality of customers as a whole. Where the ratings provided by the given customer for one or more agents deviate from standardized or normalized ratings provided by a plurality of customers regarding such agents in a favorable manner, one or more of the agents may be identified as preferred for the customer.

Likewise, a level or set of relevant skills for addressing a subsequent contact may also be identified on any basis. For example, if a subsequent contact includes a text-based description of one or more issues, the text of the subsequent contact may be analyzed to determine which specific skills may be required or desired in order to appropriately address the issues defined therein. Where the subsequent contact includes phrases such as "my power is out again," "why is my property tax bill so high?" or "the item that I ordered arrived in a damaged condition," an agent specializing in handling power outages, tax assessments or untimely or lost shipments may be identified. Therefore, in the event that an agent with prior experience in handling contacts received from the customer is not available, and none of the customer's preferred agents are available, the contact may be assigned to one or more agents having an appropriate level or set of skills. Similarly, where an original contact received from a customer was resolved in a specific manner by an agent, one or more skills associated with the resolution to the original contact may be identified. For example, if the agent is known or believed to possess many skills, one or more relevant skills associated with the resolution may be associated with subsequent contacts received from the customer.

Those of ordinary skill in the pertinent arts will recognize that the designations of agents as "original," "preferred" or "skilled" are not exclusive. For example, an "original" agent may also be "preferred" by the customer, and may be further determined to be "skilled" in the context of a subsequent contact. Likewise, where a prior contact received from a customer was handled or resolved by two or more agents, either or all of such agents may be deemed "original" agents based at least in part on their handling or resolution of the prior contact.

Moreover, the availability of a particular agent (e.g., an original agent, a preferred agent or a skilled agent) may be determined on any basis. For example, where a subsequent contact is received from a customer, a status of an agent who handled an original contact received at the service center from the customer may be determined. If the agent is available to address the subsequent contact, then the service center may assign the subsequent contact to the agent immediately. If the agent is currently unavailable, e.g., occupied addressing a contact received from another customer, a probability or likelihood that the agent will become available for addressing the subsequent contact within a predetermined period of time may be determined.

For example, if a maximum allowable delay time by which the subsequent contact must be assigned to any agent is defined (e.g., thirty seconds or one minute), a probability that the original agent will become available within the maximum delay time may be calculated based on the original agent's prior history in addressing contacts in general, any attributes associated with the customer, the original contact or the subsequent contact, or any specific information that may be known regarding a contact being addressed or other task being performed by the original agent at the time that the subsequent contact is received. If it is anticipated that the original agent may become available within the maximum allowable delay time, then the subsequent contact may be held in abeyance until the status of the original agent, or the contact currently being addressed by the original agent, may be determined. If it is anticipated that the original agent will not become available within the maximum allowable delay time, however, then the status of one or more preferred agents or skilled agents may be identified, and the subsequent contact may be ultimately assigned to one or more of such agents based on their respective availability.

The estimated availability of an agent, or an estimated time by which the agent will become available, may be determined by any means or on any basis. For example one or more machine learning techniques or algorithms may process any available information regarding the agent's performance history, or the issues previously reported by a customer in one or more prior contacts, in determining whether the agent will be able to properly handle a subsequent contact received from a customer.

According to some embodiments of the present disclosure, a targeted issue routing system or method may be triggered by way of an electronic communication provided by an agent to a customer in response to an original contact received from the customer. Where a customer provides a contact to a service center, and the contact is assigned to an agent, a response may be prepared by the agent and provided by the service center to the customer in one or more electronic messages (e.g., E-mail, text messages or messages presented on a user interface, such as a web browser). Such electronic messages may be provided with one or more interactive features (e.g., buttons, icons or text-based hyperlinks) associated with a software widget that may initiate a contact with the service center.

For example, when a customer receives an E-mail from a service center that includes an interactive feature tied to a software widget maintained at the service center in response to a first contact, such as the button 180 in the response message 160 of FIG. 1, the customer may select the interactive feature and cause a second contact to be initiated. The selection of the interactive feature may cause a set of metadata to be returned to one or more servers or server-side applications provided at the service center, with the set of metadata identifying the customer, the first contact, as well as any relevant information regarding the selection (e.g., a time or day of the selection, a computer device or application from which the selection was received, a location of the customer or the computer device at a time of the selection). Once the set of metadata is received at the service center, a determination as to whether the agent who prepared the E-mail in response to the first contact is available, or whether any preferred agents or particularly skilled agents are available, may be made, and an appropriate agent for responding to the subsequent contact may be identified thereby. The selection may further result in the initiation of one or more forms of communication between the customer and the selected agent, such as a chat session involving the exchange of audio, video or text-based information, or any other data. Accordingly, the systems and methods of the present disclosure may facilitate the initiation of a subsequent contact with a service center from a customer by means of a reply to an original contact furnished to the customer, and the subsequent contact may be properly routed to one or more appropriate agents once the reply is received.

Figure 2:
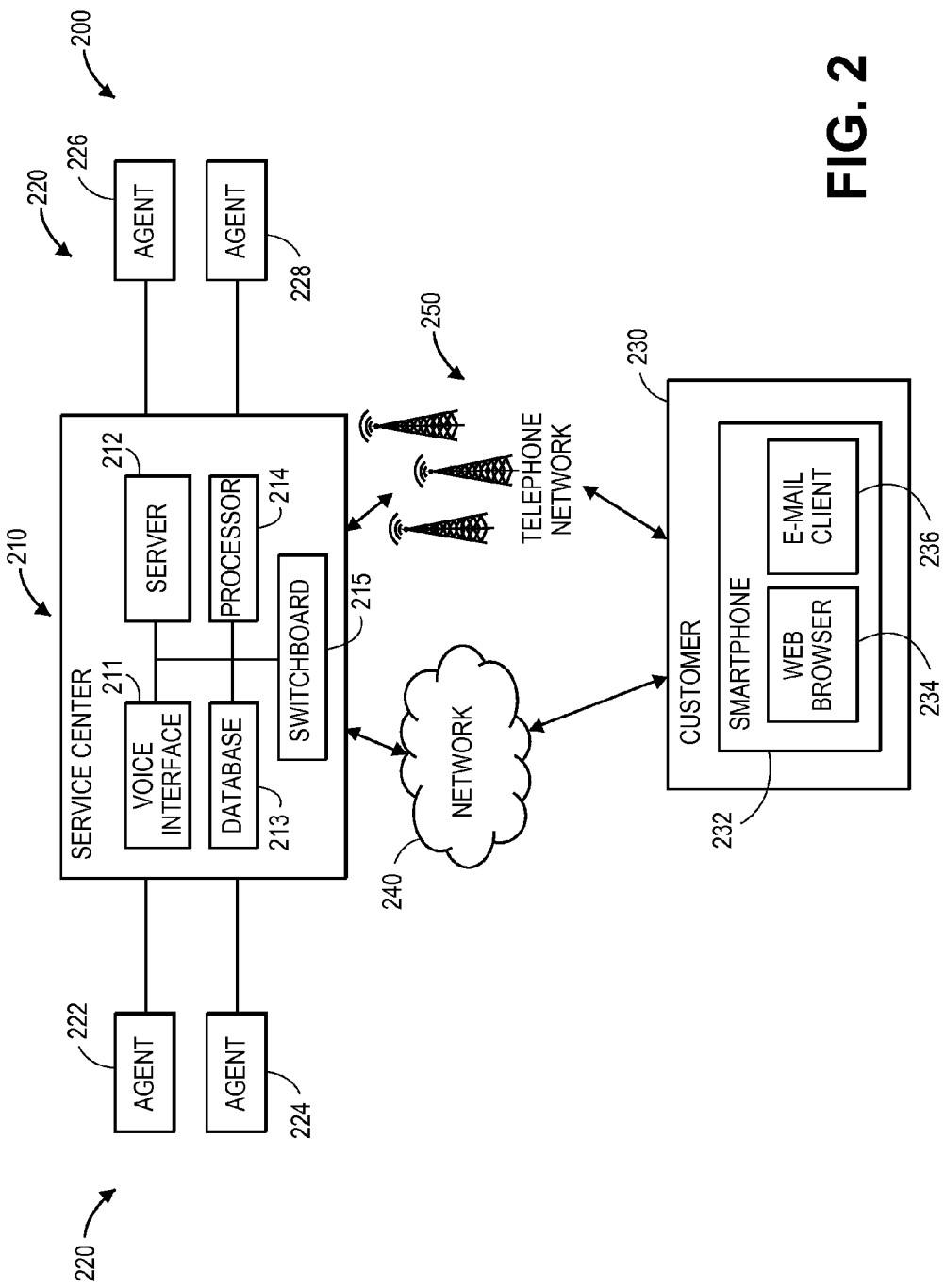
FIG. 2 is a block diagram of components of one system for targeted issue routing, in accordance with embodiments of the present disclosure.

As is discussed above, the systems and methods of the present disclosure may be provided in connection with any type or form of service center that may be provided in order to receive information, data or other feedback from one or more customers or other relevant users. Referring to FIG. 2, a block diagram of one system 200 for targeted issue routing is shown. The block diagram includes a service center 210 having a pool of agents 220 and a customer 230 who are connected to one another across a computer network 240, such as the Internet, as well as a telephone network 250. Except where otherwise noted, reference numerals preceded by the number "2" shown in the block diagram of FIG. 2 indicate components or features that are similar to components or features having reference numerals preceded by the number "1" shown in the system 100 of FIG. 1.

The service center 210 may be any center intended or implemented to receive, analyze, address and respond to any communications received from customers or users, such as the customer 230. The service center 210 may be associated or affiliated with any type of business or organization that may be required to, or may expect to, receive such communications from one or more affiliated users (e.g., customers of an online marketplace). In furtherance of its purpose, the service center 210 may be adapted to receive audio, video or text-based communications from one or more customers, such as the customer 230, by way of the computer network 240 or the telephone network 250. As is shown in FIG. 2, the service center 210 includes a plurality of hardware components or software applications, as necessary, provided for general purposes, or for the specific purpose of receiving contacts from customers, such as the customer 230. For example, the service center 210 may include a voice interface 211, which may include one or more devices for receiving and/or transmitting telephonic communications with the customer 230. Additionally, the service center 210 may include other standard hardware components, such as a server 212, a database 213, a processor 214 and a switchboard 215 for receiving and distributing contacts received from the customer 230 to one of the pool of agents 220, including the individual agents 222, 224, 226, 228, as well as for storing information regarding such contacts and/or any types of actions taken or resolutions provided in response to such contacts, including but not limited to any electronic messages transmitted to the customer 230.

During operation of the system 200, the customer 230 may communicate with the service center 210 regarding one or more issues by one or more audio, video or text-based means, such as by using a smartphone 232, and the communication may take the form of a "contact." Such contacts may be received from the customer 230 by way of the computer network 240 or the telephone network 250 and handled internally within the service center 210, as appropriate. For example, the service center 210 may provide one or more machines that receive and direct contacts from the customer 230 to one or more of the agents 222, 224, 226, 228 at random or on any basis, including one or more automatic text-based analyses of any information included in the contact, whether one or more of the agents is experienced in dealing with the customer 230 or the contact or any issues expressed therein. Further, the service center 210 may provide one or more front-line operators (not shown) for evaluating contacts and routing such contacts to one or more agents or representatives, as appropriate.

The pool of agents 220 may include any number of agents 222, 224, 226, 228 having experience or qualifications relating to any number of tasks or functions associated with the service center 210. The agents 222, 224, 226, 228 may use any standard communication devices and systems, including web-enabled or Internet applications, such as web browsers, user interfaces or any other client-server applications or features to communicate with (or connect to) one another or to access the voice interface 211, the server 212, the database 213, the processor 214 or the switchboard 215, or to communicate with one another or with customers, such as the customer 230, over the computer network 240 or the telephone network 250. For example, the agents 222, 224, 226, 228 may use any of a number of devices that are capable of communicating over the network, including but not limited to set-top boxes, personal digital assistants, mobile phones, smartphones, digital media players, web pads, tablets, laptop computers, desktop computers, electronic book readers, and the like. The protocols and components for providing communication between the agents 222, 224, 226, 228 and the service center 210, or between the service center 210 and one or more computers or computer devices over the computer network 240 or the telephone network 250 are well known to those skilled in the art of electronic communications and thus, need not be described in more detail herein.

The customer 230 may be any entity or individual that wishes to execute, perform or request any service or function by way of any business or organization with which the service center 210 may be associated. For example, the customer 230 may be any individual or entity that intends to download, purchase, rent, lease, borrow or otherwise obtain items (which may include goods, products, services or information of any type or form) from an online marketplace. When contacting the service center 210, the customer 230 may utilize one or more computing devices, such as a smartphone 232 or any other like machine that may operate or access one or more software applications, such as a web browser 234 or an E-mail client 236, and may be connected to or otherwise communicate with the service center 210 through the computer network 240 or the telephone network 250, by the transmission and receipt of digital data or signals.

The computers, servers, devices and the like described herein may have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "service center," an "agent" or a "customer," or like terms, may be automated steps performed by their respective computer systems, or implemented within software modules (or computer programs) executed by one or more general purpose computers. Moreover, process steps described as being performed by a "service center," an "agent" or a "customer," or like terms, may be typically performed by a human operator, but could, alternatively, be performed by an automated computer system.

The service center 210 and the customer 230 may use any web-enabled or Internet applications or features, or any other client-server applications or features including electronic mail (or E-mail), or other messaging techniques, to connect to the computer network 240 or the telephone network 250 or to communicate with one another, such as through short or multimedia messaging service (SMS or MMS) text messages. For example, the customer 230 and/or the smartphone 232 may be adapted to transmit information or data in the form of synchronous or asynchronous messages to the service center 210 through the voice interface 211, the server 212, the database 213, the processor 214 or the switchboard 215, or any other computer device in real time or in near-real time, or in one or more offline processes, via the computer network 240 or the telephone network 250. Those of ordinary skill in the pertinent art would recognize that the service center 210 or the customer 230 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the smartphone 232, or any other computers or control systems utilized by the service center 210, any of the agents 222, 224, 226, 228 or the customer 230, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
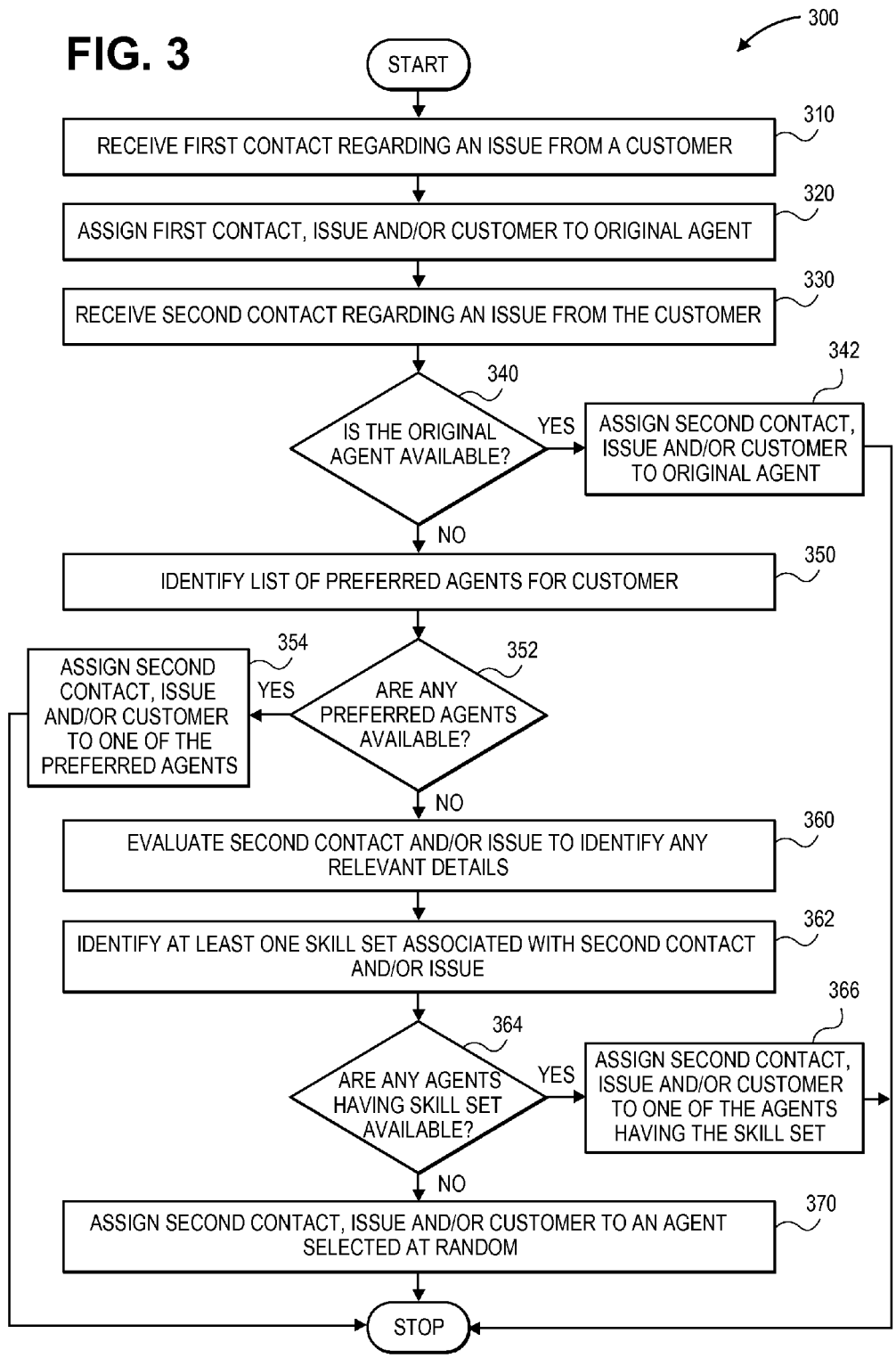
FIG. 3 is a flow chart of one process for targeted issue routing, in accordance with embodiments of the present disclosure.

As is discussed above, the systems and methods of the present disclosure are directed to assigning a contact received from a customer to one or more agents according to a hierarchy or protocol. Specifically, the contact may be preferably assigned to an agent who is experienced in working with the customer, or, alternatively, to an agent preferred by the customer, or an agent having a specific skill set that may be required in order to properly address any issues identified in the contact. If no experienced, preferred or particularly skilled agents are available, the contact may be assigned to an agent at random. Referring to FIG. 3, a flow chart 300 representing one embodiment of a process for targeted issue routing in accordance with embodiments of the present disclosure is shown. At box 310, a first contact is received from a customer regarding an issue. The first contact may take any form, such as an E-mail, text message, or other electronic message provided by way of one or more user interfaces (e.g., a text box within a web browser having a web page expressed thereon).

At box 320, the first contact, the issue and/or the customer are assigned to an original agent, who may be selected at random, or may be the next available agent for handing general or specific issues that may arise. The first contact, the issue and/or the customer may be assigned to the original agent in any manner, such as by transmitting one or more electronic messages from the server 212 to one or more computer devices operated by one of the agents 222, 224, 226, 228 of FIG. 2. At box 330, a second contact regarding an issue is received from the customer. The issue included in the second contact may relate to the issue described in the first contact (e.g., the second contact may be a repeat contact), or may be unrelated to the first contact (e.g., the second contact may be a return contact).

At box 340, whether the original agent is available to handle the contact is determined. For example, a service center may consult a list or registry of agents who are actively employed in taking contacts from one or more customers, and determine whether the original agent is presently available, or may be expected to be available within a sufficiently brief period of time. If the original agent is available, then the process advances to box 342, where the second contact is assigned to the original agent, and the process ends.

However, if the original agent is not available, then the process advances to box 350, where the system identifies a list of preferred agents for the customer. As is discussed above, the preferred agents may be identified in any manner, such as by determining whether any of the agents at a service center have been expressly identified as preferred by the customer. Alternatively, agents having either a general performance rating assigned by more than one customer, or a specific performance rating assigned by the customer, that ranks above or otherwise exceeds a given threshold may be designated as preferred. A customer may also generally designate a class of agents as preferred based on one or more attributes (e.g., a number of years' experience, or a particular degree or certification).

At box 352, whether any of the preferred agents are available to handle the contact is determined. If any of the preferred agents is available, then the process advances to box 354, where the contact is assigned to one of the preferred agents, and the process ends. The preferred agent to whom the contact is assigned may be selected on any basis, e.g., an agent having a highest ranking or designation of preference among the preferred agents identified by the customer.

If no preferred agents are available, however, then the process advances to box 360, where the second contact and/or the issue identified therein are evaluated in order to identify any relevant details regarding the second contact or the issue. Such details may include but are not limited to intrinsic information (e.g., one or more keywords or phrases included in the contact that may relate to or describe the issue), as well as any extrinsic information (e.g., any times, dates or locations associated with the issue that may be correlated with any other issues or otherwise serve as a basis for identifying an agent). At box 362, at least one skill set associated with either the second contact or the issue is identified. For example, where the issue references a utility outage or a damaged good, agents who are skilled in handling issues regarding utilities or the specific good in question may be identified. Where the second contact identifies a particular location, agents who are experienced or knowledgeable regarding the particular location may be identified.

At box 364, whether any agents having the skill set identified at box 362 are available to handle the contact is determined. If any agents having the skill set identified at box 362 are available, then the process advances to box 366, where the second contact, the issue and/or the customer are assigned to one of the agents having the skill set, and the process ends. Where multiple agents who possess the skill set are available, one or more of such agents may be selected for handling the second contact, the issue and/or the customer on any basis.

If no agents having the skill set identified at box 362, the process advances to box 370, where the second contact, the issue and/or the customer are assigned to an agent selected at random. For example, one or more of a pool of agents may be selected and assigned the task of responding to the second contact. Alternatively, the second contact may be assigned to any of the agents in the pool, who may be selected on any other basis, e.g., the next available agent.

Figure 4:
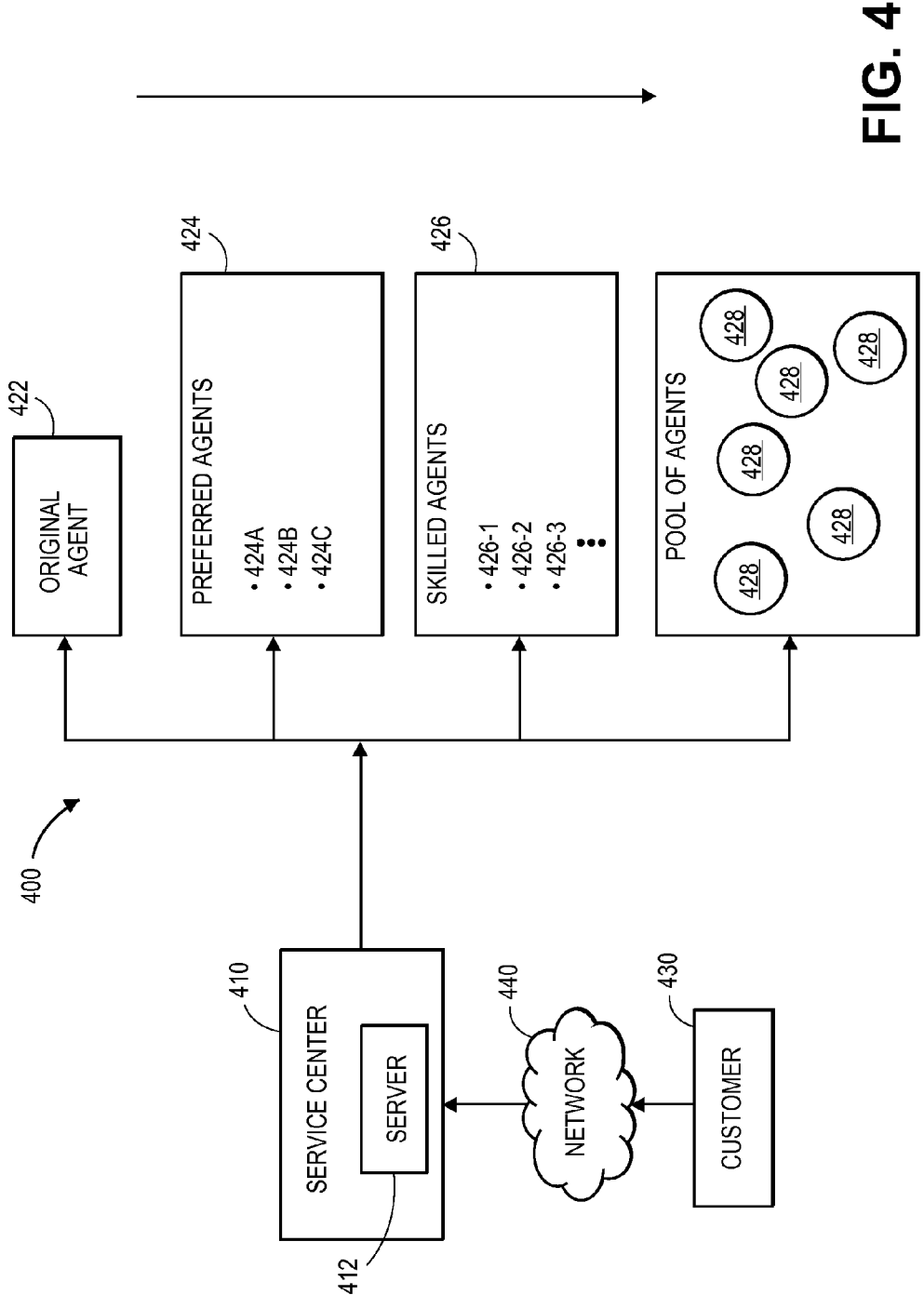
FIG. 4 is a block diagram of components of one system for targeted issue routing, in accordance with embodiments of the present disclosure.

The operation of some systems and methods for targeted issue routing in accordance with the present disclosure, such as the flow chart 300 of FIG. 3, may be shown with regard to FIG. 4. Referring to FIG. 4, a flow diagram 400 associated with targeted issue routing in accordance with the present disclosure is shown. Except where otherwise noted, reference numerals preceded by the number "4" shown in the block diagram of FIG. 4 indicate components or features that are similar to components or features having reference numerals preceded by the number "2" shown in the block diagram of FIG. 2.

As is shown in FIG. 4, when a customer 430 provides a subsequent contact (e.g., a return contact or a repeat contact) to a service center 410 over a network 440, a server 412 or other computer component associated with the service center 410 may be programmed to identify an agent for handling the contact according to a predetermined hierarchy. First, the server 412 may be programmed to identify an original agent 422 who handled an original contact received from the customer. Second, if the original agent 422 is not available, the server 412 may be programmed to identify a list or set of preferred agents 424 identified by or on behalf of the customer 430, and select one of the agents 424A, 424B, 424C for responding to the subsequent contact. Third, if none of the preferred agents 424 is available, the server 412 may identify a relevant skill set associated with the subsequent contact, and locate a list or set of agents 426 having the relevant skill. The server 412 may select one of the agents 426-1, 426-2, 426-3 identified as having the relevant skill on any basis. Finally, if neither an original agent 422 who handled an original contact received from the customer 430, nor an agent 424A, 424B, 424C identified as preferred by the customer 430, nor any agents 426-1, 426-2, 426-3 identified as having a relevant skill set required to address the subsequent contact is available, then the subsequent contact may be assigned to an agent 428 randomly selected from a pool of agents.

Figure 5:
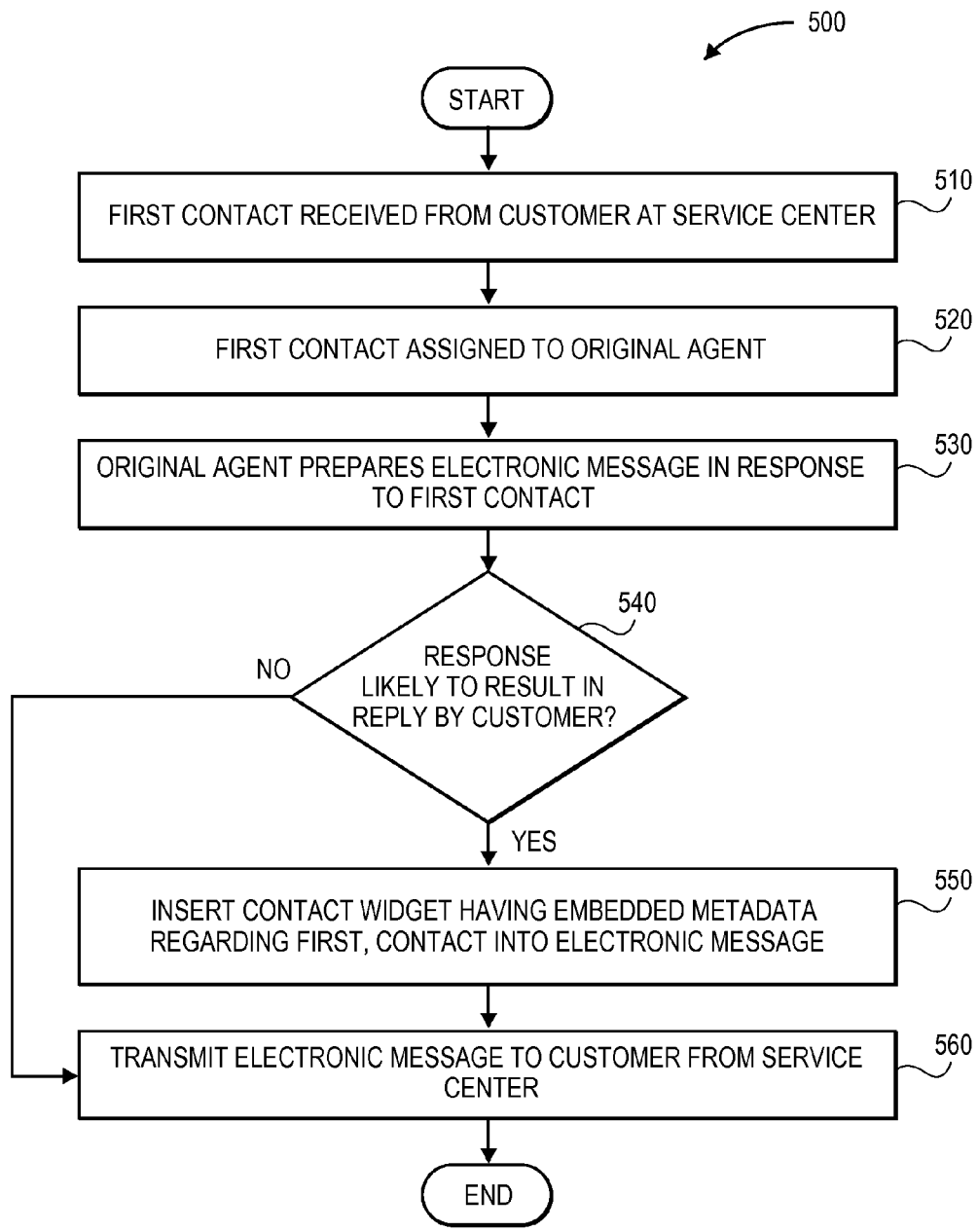
FIG. 5 is a flow chart of one process for targeted issue routing, in accordance with embodiments of the present disclosure.

As is discussed above, the targeted issue routing systems and methods disclosed herein may be used to provide a reply to an original contact received from a customer by a service center in the form of an electronic message that permits the customer to initiate a subsequent contact with the service center. Referring to FIG. 5, a flow chart 500 representing one embodiment of a process for targeted issue routing in accordance with embodiments of the present disclosure is shown. At box 510, a first contact is received from a customer at a service center. The first contact may take any form, including not only an electronic message (e.g., an E-mail or a text message) sent by the customer to the service center but also a telephone call, a letter or any other suitable communication for identifying an issue or concern held by the customer.

At box 520, the first contact is assigned to an original agent, who may be identified at random or on an ordinal ranking or basis (e.g., the next available agent). At box 530, the original agent prepares a response to the first contact, in the form of an electronic message. The electronic message may take any form, including an E-mail message, a text message, or a secure message posted to one or more web sites.

At box 540, whether the response is likely to result in a reply by the customer is determined. For example, where a contact includes an issue having a readily identifiable, fact-based answer, e.g., a question as to the operating hours of a business or organization, a response to the contact is unlikely to result in any form of reply. Where the contact includes an open-ended issue, or an issue that may have one or more elements that may change in value or degree over time, or where the response expressly invites a submission of additional information from the customer, the reply may be deemed likely to result in some form of reply from the customer. A likelihood of a reply may be expressed in any qualitative or quantitative terms, such as a probability, and defined with regard to one or more relative thresholds. If no reply to the response is anticipated, then the process advances to box 560, and the electronic message is transmitted to the customer from the service center, and the process ends.

If one or more replies to the response are anticipated, however, then the process advances to box 550, where a contact widget having embedded data regarding the first contact is embedded into the electronic message. The contact widget may comprise one or more interactive features (e.g., buttons, icons or hyperlinks) of any form, e.g., the button 180 within the interface window 170 of the response message 160 of FIG. 1A, which may be selected or activated in order to initiate a second or further contact with the service center. The embedded metadata associated with the widget may identify or include any relevant information regarding the first contact (e.g., a time or date when the first contact was received, or one or more serial numbers or keywords regarding subject matter with which the first contact is associated), or references to such relevant information (e.g., a serial number or other identifier associated with the first contact, which may be located in an index or look-up table in order to access information regarding the first contact). Such information regarding the first contact may be used to identify not only the customer but also the original agent who crafted the electronic message in response to the first contact. At box 560, the electronic message having the contact widget inserted therein is transmitted to the customer from the service center, and the process ends.

Figure 6:
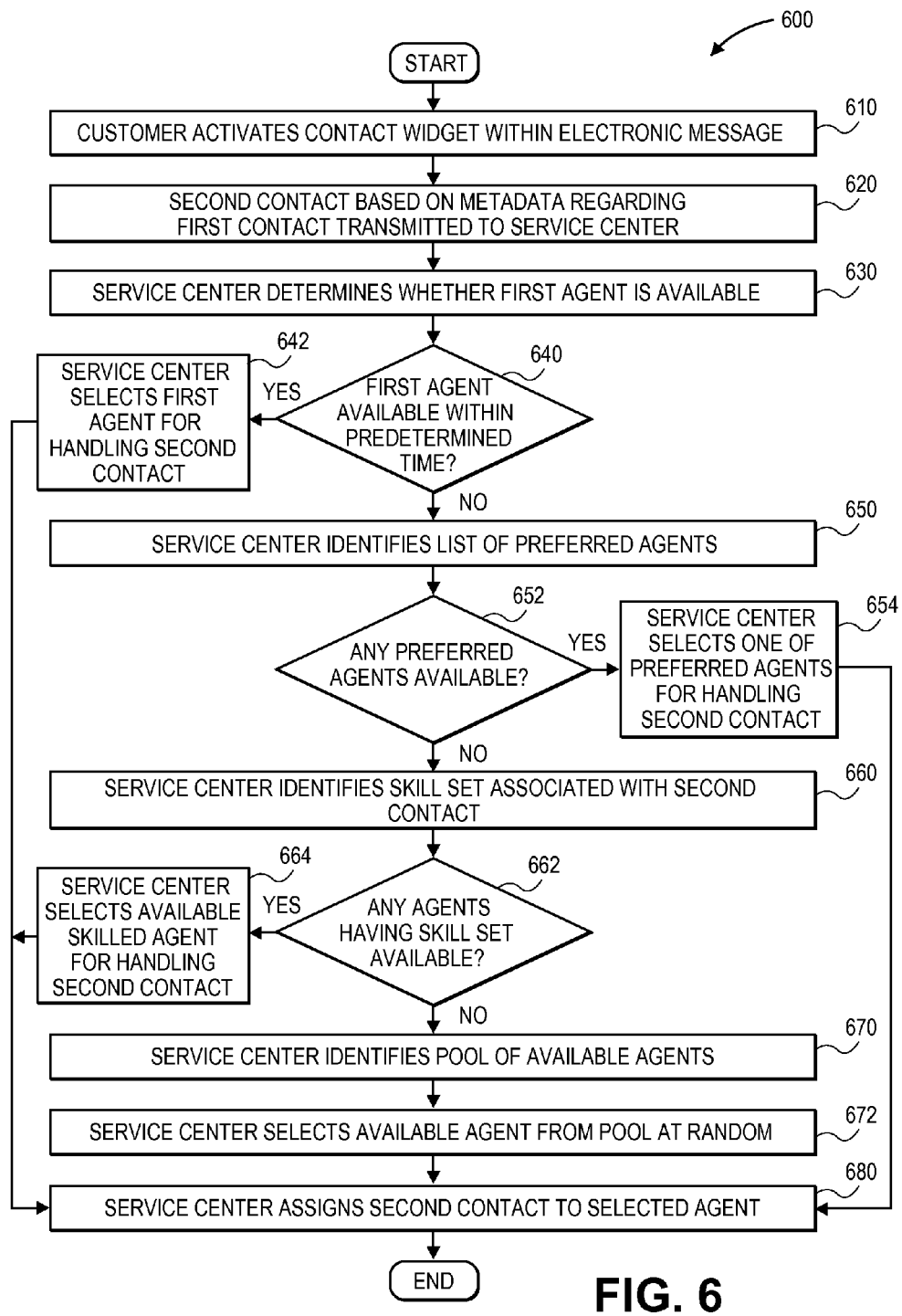
FIG. 6 is a flow chart of one process for targeted issue routing, in accordance with embodiments of the present disclosure.

When a contact widget or like element included within a response provided by a service center to a customer who provided an original contact is activated by the customer, a subsequent contact may be generated, and the subsequent contact may be properly allocated to an agent or representative in accordance with one or more of the systems and methods of the present disclosure. Referring to FIG. 6, a flow chart 600 representing one embodiment of a process for targeted issue routing in accordance with embodiments of the present disclosure is shown. At box 610, a customer activates a contact widget within an electronic message. For example, referring again to FIGS. 1A and 1B, the customer 130 may select the button 180 embedded within the response message 160 when the response message 160 is received at the smartphone 132.

At box 620, a second contact based on metadata regarding the first contact is transmitted to the service center. The second contact may include or reference information expressly provided by the customer, e.g., identifying an issue and any associated facts, or may be limited to intrinsic information regarding the first contact or the electronic message itself, which may be returned to the service center upon the activation of the contact widget. At box 630, the service center determines whether the first agent is available. For example, where the metadata identifies the first agent (e.g., by name or by an employee number or other identifier), the service center may access a look-up table or other record including information regarding then-available agents, and determine whether the first agent is one of them.

At box 640, whether the first agent, viz., the agent who handled the first contact, becomes available within a predetermined time is determined. For example, the predetermined time may be a maximum allowable delay time that a customer may be expected to wait for a response to the second contact, or a delay time associated with the particular customer, or other contacts of the same general nature as the second contact. The predetermined time may be defined based at least in part on any attributes that may be known or determined regarding the customer, the first contact, the second contact, or any issues identified in either the first contact or the second contact.

If the first agent is available to handle the second contact within the predetermined time, then the process advances to box 642, where the service center selects the first agent for handling the second contact, and to box 680, where the service center assigns the second contact to the selected agent. If the first agent is not available within the predetermined time, however, then the process advances to box 650, where the service center identifies a list of preferred agents. As is discussed above, such preferred agents may have been expressly designated by the customer, or identified by any quantitative or qualitative means or based on any type of metric.

At box 652, the service center determines whether any of the preferred agents on the list identified at box 650 is available to handle the second contact. If any of the preferred agents is available, then the process advances to box 654, where the service center selects one of the preferred agents for handling the second contact, and to box 680, where the service center assigns the second contact to the selected agent. However, if none of the preferred agents is available, then the process advances to box 660, where the service center identifies a skill set associated with the second contact. The skill set may be identified based on any express language, information or data provided by the customer regarding the second contact, e.g., keywords or other terms used to describe one or more issues, as well as any intrinsic information.

Once a skill set associated with the second contact has been identified, the process advances to box 662, where the service center determines whether any agents having the skill set are available. If one or more such skilled agents is available, then the process advances to box 664, where the service center selects one of the skilled agents for handling the second contact, and to box 680, where the service center assigns the second contact to the selected agent. However, if no agent having the skill set identified at box 660 is available to handle the second contact, then the process advances to box 670, where the service center identifies a pool of available agents. The pool may include all agents then associated with the service center, or may be filtered or limited to include only agents satisfying one or more criteria, e.g., a particular level of experience or qualification. At box 672, the service center selects an available agent from the pool at random, and at box 680, the service center assigns the second contact to the selected agent.

Accordingly, a selection of an interactive feature included in a reply to a first contact furnished by a customer may generate a second contact, and trigger one or more of the targeted issue routing systems and methods disclosed herein by transmitting metadata including information regarding the first contact, the second contact, the customer or an agent who crafted the reply to the first contact. As a result, the second contact may be assigned to one or more agents according to a hierarchy, beginning with the agent who crafted the reply, followed by any agents who may be preferred by the customer, as well as any agents who may possess any relevant skills identified or associated with the second contact. If neither the agent who crafted the reply nor any preferred or particularly skilled agents is available, then an agent to whom the second contact is to be assigned may be selected at random. Once an agent has been selected following the activation of an interactive feature, such as the button 180 included in the response message 160 of FIG. 1, a communication session between the customer and the selected agent may be convened. The communication session may take the form of an audio, video or text-based chat session, an exchange of one or more other electronic messages, or any other series of interactions between the customer and the selected agent.

Figure 7:
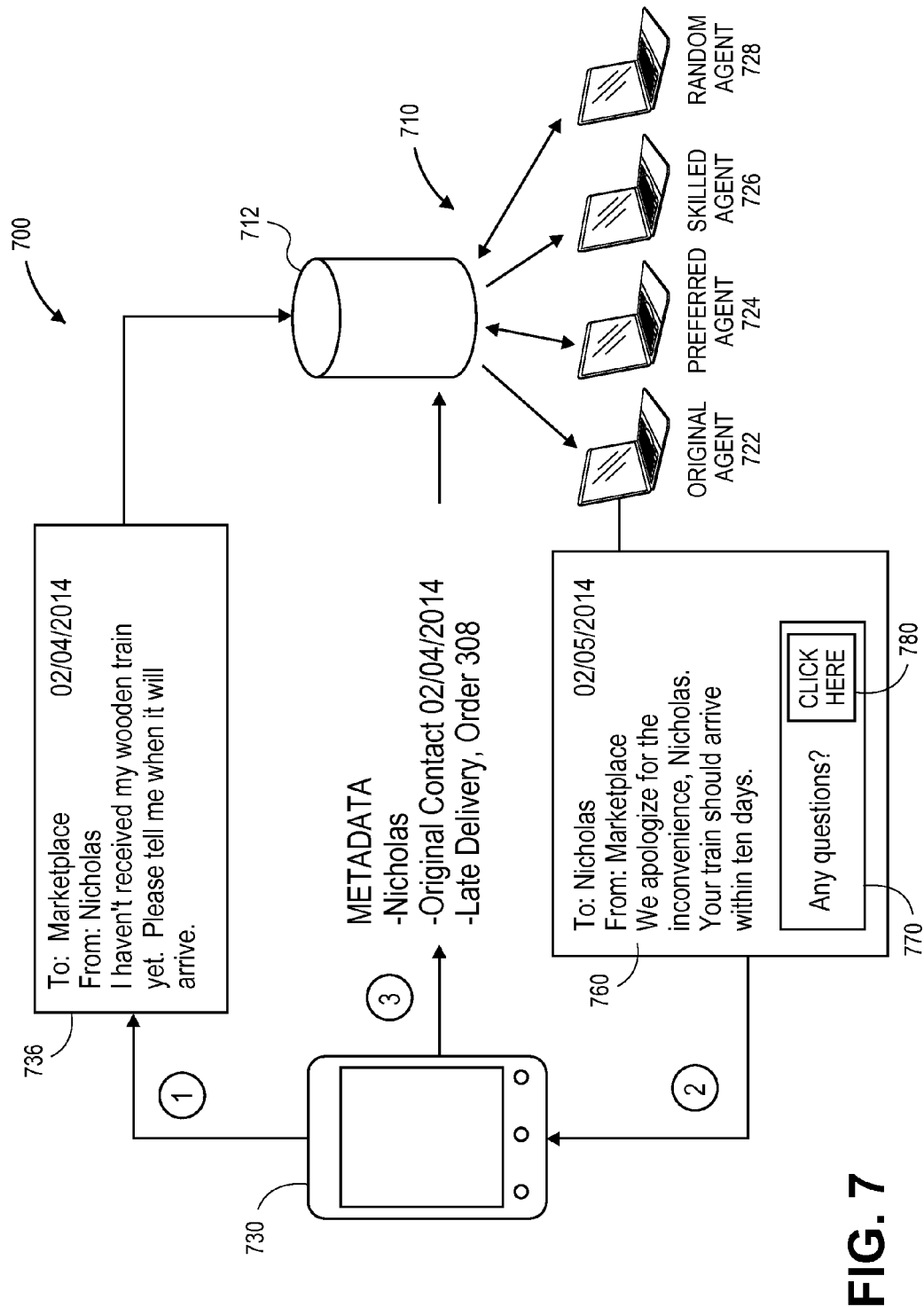
FIG. 7 is a flow diagram associated with targeted issue routing in accordance with embodiments of the present disclosure.

The flow of data between a customer and a service center during the submission of a first contact by a customer, the transmission of a reply to the first contact generated by an original agent to the customer, and the submission of a second contact by the customer in response to a selection of an interactive feature included in the reply, is shown in FIG. 7. Referring to FIG. 7, a flow diagram 700 associated with targeted issue routing in accordance with embodiments of the present disclosure is shown. Except where otherwise noted, reference numerals preceded by the number "7" shown in the block diagram of FIG. 7 indicate components or features that are similar to components or features having reference numerals preceded by the number "4" shown in the block diagram of FIG. 4 or by the number "2" shown in the block diagram of FIG. 2.

First, a customer 730 may transmit a message 736 identifying an issue to a service center 710 using an E-mail client, web browser or other application operating on a smartphone 732 or other computer device. Next, the service center 710 may then select an agent, viz., agent 722, to provide a message 760 in response to the issue identified in the message 736. The message 760 may include information referencing the issue identified in the message 736, and a resolution of the issue, or a summary of a status of the issue. As is shown in FIG. 7, the message 760 may further include an interface window 770 and/or an interactive button or other feature 780 for enabling the customer 730 to contact the service center 710 in reply to the message 760.

Finally, upon a selection of the interactive feature 780, a set of metadata may be transmitted to the server 712 as part of a reply contact from the customer 730. The set of metadata may identify the customer 730, as well as information regarding the previous experience of the customer 730 in contacting the service center 710 along with any other information or data that may be identified regarding the original contact (e.g., an issue or root cause). Once the set of metadata shown in FIG. 7 is received by the service center 710, the server 712 may select an agent for handling the reply contact on any basis, such as according to one or more of the hierarchies identified or described above.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the service centers of the present disclosure are associated with the ordering of items from an online marketplace by a customer, and the delivery of the ordered items from a fulfillment center, warehouse or like facility to a customer, the systems and methods of the present disclosure are not so limited, and may be used in any environment in which a service center is required in order to provide assistance to one or more customers or users. Those of ordinary skill in the pertinent arts will recognize that the targeted issue routing systems and methods disclosed herein are equally capable for handling inquiries from customers of a power company, subscribers to a cable television service, purchasers of consumer products or citizens contacting an agency of a local, state or national government. In general, such systems and methods may be used in connection with any form of service center configured to receive telephonic and/or electronic communications from customers or other users by any means.

Moreover, the systems and methods of the present disclosure may be triggered or otherwise implemented by a reply or follow-on contact in any manner, including but not limited to the selection of an interactive feature embedded in an electronic message, such as is shown in FIG. 1A, 1B or 7. For example, upon receiving a reply E-mail from a customer, the systems and methods of the present disclosure may attempt to determine which agent transmitted an E-mail to the customer which prompted the reply, and assign the reply E-mail to that agent or, alternatively, to an agent preferred by the customer, an agent having a particular skill required to respond to the E-mail or an agent selected at random.

Additionally, although many of the contacts disclosed herein are based on electronic communications such as E-mail or text messages, the targeted issue routing systems and methods of the present disclosure are also not so limited. Rather, such systems and methods may be used to assign contacts received by telephone or traditional mail (viz., "snail mail") from one or more customers.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 6, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer-readable medium having computer-executable instructions stored thereon,
wherein the instructions, when executed, cause a computer system having at least one computer processor and at least one data store to perform a method comprising:
transmitting an electronic message regarding an issue to a customer over a network, wherein the electronic message comprises an interactive feature;
receiving information regarding a selection of the interactive feature by the customer over the network;
identifying a first agent for responding to the customer based at least in part on the selection of the interactive feature, wherein the first agent is associated with the issue;
determining whether the first agent is available to respond to the customer;
upon determining that the first agent is not available to respond to the customer,
identifying at least one preferred agent associated with the customer using the at least one computer processor;
determining whether the at least one preferred agent is available to respond to the customer; and
upon determining that the at least one preferred agent is available to respond to the customer,
providing information regarding the customer to the at least one preferred agent using the at least one computer processor.

2. The non-transitory computer-readable medium of claim 1, wherein the interactive feature is associated with a set of metadata identifying at least the customer, and
wherein receiving information regarding the selection of the interactive feature by the customer over the network comprises:
receiving the set of metadata in response to the selection of the interactive feature by the customer.

3. The non-transitory computer-readable medium of claim 1, wherein the method further comprises:
determining a probability that the customer will respond to the message regarding the issue; and
upon determining that the probability exceeds a predetermined threshold,
inserting the interactive feature into the electronic message.

4. The non-transitory computer-readable medium of claim 1, wherein the method further comprises:
upon determining that the at least one preferred agent is not available to respond to the customer,
identifying a skill associated with the issue;
identifying at least one agent having the skill associated with the issue; and
providing the information regarding the customer to the at least one agent having the skill using the at least one computer processor.

5. A method comprising:
receiving information identifying a first issue from a customer over a network;
determining whether a first agent is available to address the first issue, wherein the first agent is associated with information identifying a second issue previously received from the customer;
upon determining that the first agent is not available to address the first issue;
identifying at least one preferred agent associated with at least one of the customer or the first issue;
determining whether the at least one preferred agent is available to address the first issue; and
upon determining that the at least one preferred agent is available to address the first issue,
assigning the first issue to the at least one preferred agent.

6. The method of claim 5, further comprising:
upon determining that the at least one preferred agent is not available to address the first issue,
identifying at least one skill associated with the first issue based at least in part on the information identifying the first issue received from the customer;
identifying at least one of a plurality of agents having the at least one skill associated with the first issue using the at least one computer processor;
determining whether the at least one of the plurality of agents having the at least one skill associated with the first issue is available to address the first issue; and
upon determining that the at least one of the plurality of agents having the at least one skill associated with the first issue is available to address the first issue,
assigning the first issue to the at least one of the plurality of agents having the at least one skill associated with the first issue.

7. The method of claim 6, further comprising:
upon determining that the at least one of the plurality of agents having the at least one skill is not available to address the first issue,
selecting an agent from a pool of available agents; and
assigning the first issue to the selected available agent.

8. The method of claim 6, wherein the at least one skill associated with the first issue is identified based at least in part on one of:
a skill associated with the second issue; or
a skill associated with the first agent.

9. The method of claim 6, wherein assigning the first issue to the at least one of the plurality of agents having the at least one skill associated with the first issue comprises:
selecting one of the plurality of agents having the at least one skill associated with the first issue at random; and
assigning the first issue to the selected one of the plurality of agents having the at least one skill associated with the first issue.

10. The method of claim 5, wherein identifying the at least one preferred agent associated with at least one of the customer or the first issue comprises:
identifying information regarding a plurality of agents designated as preferred by the customer; and
selecting the at least one preferred agent from the plurality of agents designated as preferred by the customer.

11. The method of claim 10, wherein selecting the at least one preferred agent from the plurality of agents comprises at least one of:
selecting one of the plurality of agents designated as preferred at random; or identifying an ordinal ranking of the plurality of agents designated as preferred, and selecting one of the plurality of agents designated as preferred based at least in part on the ordinal ranking.

12. The method of claim 5, wherein identifying the at least one preferred agent associated with at least one of the customer or the first issue comprises:

identifying information regarding a plurality of ratings of agents provided by the customer; and selecting the at least one preferred agent based at least in part on at least one of the plurality of ratings of agents provided by the customer.

13. The method of claim 5, further comprising:

identifying information regarding the second issue, wherein the information regarding the second issue is associated with the first agent; and transmitting at least some of the information regarding the second issue to the customer over the network.

14. The method of claim 13, wherein the at least some of the information regarding the second issue comprises an electronic message having an interactive feature embedded therein, and wherein the interactive feature is associated with metadata regarding at least the second issue.

15. The method of claim 14, wherein receiving the information identifying the first issue from the customer over the network comprises:

receiving information regarding a selection of the interactive feature from the customer over the network, wherein the information regarding the selection of the interactive feature comprises at least some of the metadata.

16. A service center comprising:

a plurality of service agents, wherein each of the service agents is associated with a computing device; and at least one server connected to a communications network, wherein the at least one server is in communication with each of the computing devices, and wherein the at least one server is configured to:

identify a response to a first communication received from a customer, wherein the response is generated by a first service agent;

determine a probability that the customer will reply to the response to the first communication;

upon determining that the probability that the customer will reply to the response to the first communication exceeds a first threshold, generate a set of metadata regarding the first communication;

generate a message comprising the response to the first communication generated by the first service agent and an interactive feature associated with the set of metadata regarding the first communication;

transmit the message to the customer over the communications network;

receive information regarding a second communication from the customer over the communications network, wherein the information regarding the second communication comprises a selection of the interactive feature;

select a second service agent to generate a response to the second communication based at least in part on the set of metadata; and assign the second communication to the second service agent.

17. The service center of claim 16, wherein the second service agent is the first service agent.

18. The service center of claim 16, wherein the at least one server is further configured to:

identify at least one service agent designated as preferred by the customer, wherein the second service agent is the at least one service agent designated as preferred by the customer.

19. The service center of claim 16, wherein the at least one server is further configured to:

identify a skill set comprising a plurality of skills, wherein the skill set is associated with the second communication, and wherein the skill set comprises at least one of a skill associated with the first communication or a skill associated with the first service agent, wherein the second service agent is associated with at least one of the plurality of skills in the skill set.

20. The service center of claim 16, wherein the at least one server is further configured to:

select the second service agent at random from the plurality of service agents.

* * * * *